US012771422B2

(12) United States Patent
Tosato et al.

(10) Patent No.: US 12,771,422 B2
(45) Date of Patent: Oct. 20, 2026

(54) METHOD AND APPARATUS FOR POWER CONTROL OFFSET SCALING FOR COHERENT JOINT TRANSMISSION

(71) Applicant: Nokia Technologies Oy, Espoo (FI)

(72) Inventors: Filippo Tosato, Massy (FR); Mihai Enescu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 198 days.

(21) Appl. No.: 18/609,284

(22) Filed: Mar. 19, 2024

(65) Prior Publication Data

US 2025/0141513 A1 May 1, 2025

Related U.S. Application Data

(60) Provisional application No. 63/595,211, filed on Nov. 1, 2023.

(51) Int. Cl.
*H04W 72/1273* (2023.01)
*H04B 7/06* (2006.01)

(52) U.S. Cl.
CPC ......... *H04B 7/0626* (2013.01); *H04B 7/0632* (2013.01); *H04B 7/0639* (2013.01); *H04W 72/1273* (2013.01)

(58) Field of Classification Search
None
See application file for complete search history.

(56) References Cited

U.S. PATENT DOCUMENTS

2013/0003788 A1 1/2013 Marinier et al.
2024/0380458 A1 * 11/2024 Ryu .................... H04B 7/0626
(Continued)

FOREIGN PATENT DOCUMENTS

EP 4156540 A1 3/2023
TW I548230 B 9/2016
(Continued)

OTHER PUBLICATIONS

"3rd Generation Partnership Project; Technical Specification Group Radio Access Network; NR; Physical layer procedures for data (Release 18)", 3GPP TS 38.214, V18.0.0, Sep. 2023, pp. 1-278.
(Continued)

*Primary Examiner* — Anh Vu H Ly
(74) *Attorney, Agent, or Firm* — ALSTON & BIRD LLP

(57) ABSTRACT

In accordance with an example embodiment of the present invention, provided are methods, apparatuses and computer program products configured at least to: select an integer number N0 of channel state information reference signal (CSI-RS) resources out of an integer number of $N_{TRP}$ network configured CSI-RS resources to a resource set associated with a CSI report configuration, wherein $N<N_{TRP}$; determine a scaling factor for the resource set; determine at least one CSI component, based at least in part on an assumption that a ratio of a transmitted energy per resource element (EPRE) of a PDSCH signal and a transmitted EPRE of the $n^{th}$ CSI-RS resource is equal to the scaling factor times a power control offset configured for the $n^{th}$ CSI-RS resource of the resource set, wherein $n \in [1, N]$; and transmit a CSI report to a network comprising the determined at least one CSI component.

15 Claims, 3 Drawing Sheets

(56) References Cited

U.S. PATENT DOCUMENTS

2025/0119778 A1* 4/2025 Ly .......................... H04L 5/0057
2025/0330861 A1* 10/2025 Xuan .................... H04B 7/0626

FOREIGN PATENT DOCUMENTS

WO WO-2022024042 A1 * 2/2022 ........... H04B 7/0639
WO 2023/164839 A1 9/2023

OTHER PUBLICATIONS

"3rd Generation Partnership Project; Technical Specification Group Radio Access Network; NR; Physical channels and modulation (Release 18)", 3GPP TS 38.211, V18.0.0, Sep. 2023, pp. 1-159.
Extended European Search Report received for corresponding European Patent Application No. 24164357.6, dated Sep. 3, 2024, 8 pages.
"CSI enhancement for coherent JT and mobility", 3GPP TSG-RAN WG1 Meeting #113, R1-2304638, Agenda: 9.1.2, Huawei, May 22-26, 2023, 18 pages.
"Views on CSI Enhancements for CJT", 3GPP TSG RAN WG1 #113, R1-2304939, Agenda: 9.1.2, AT&T, May 22-26, 2023, 5 pages.
International Search Report and Written Opinion received for corresponding Patent Cooperation Treaty Application No. PCT/US2024/021632, dated Jul. 26, 2024, 9 pages.
"Maintenance on CSI enhancement for high/medium UE velocities and CJT", 3GPP TSG RAN WG1 Meeting #114bis, R1-2309917, Agenda: 9.1.2, Nokia, Oct. 9-13, 2023, 3 pages.
"Remaining issues and maintenance on Rel-18 CSI enhancement", 3GPP TSG RAN WG1 #114bis, R1-2310129, Agenda: 8.1.2, Qualcomm Incorporated, Oct. 9-13, 2023, pp. 1-8.
"3rd Generation Partnership Project; Technical Specification Group Radio Access Network; NR; Physical layer procedures for data (Release 17)", 3GPP TS 38.214, V17.7.0, Sep. 2023, pp. 1-232.
Office Action for Taiwanese Application No. 113116871 dated Dec. 18, 2025, 25 pages.
Office Action for Mexican Application No. MX/a/2026/005371 dated Jul. 3, 2026, 6 pages.

* cited by examiner

METHOD AND APPARATUS FOR POWER CONTROL OFFSET SCALING FOR COHERENT JOINT TRANSMISSION

RELATED APPLICATION

The present application claims priority from, and the benefit of, U.S. Provisional Application 63/595,211, filed Nov. 1, 2023, the contents of which are hereby incorporated by reference in their entirety.

TECHNICAL FIELD

The present application relates generally to channel state information (CSI) determination and reporting for coherent joint transmission in wireless networks.

BACKGROUND

In 3GPP New Radio (NR) Release 18, a new feature, called Type-II-CJT, was specified that extends support of Type-II codebooks to multi-transmission point (multi-TRP) channel state information (CSI) reporting for coherent joint transmission (CJT) with up to 4 distributed remote radio heads (RRH) or transmission points (TRPs). This CJT differs from earlier defined non-coherent joint transmission (NCJT) in that it assumes that each multiple input, multiple output (MIMO) layer can be transmitted from antenna ports of multiple TRPs, whereas in NCJT, each MIMO layer can only be transmitted from a single TRP.

Both NCJT and CJT assume full overlap of MIMO layers in time and frequency resources, and they both require accurate time synchronization between TRPs to be within the cyclic prefix of a symbol. Additionally, CJT also assumes phase synchronisation between TRPs such that precoding of a MIMO layer can be applied across antenna ports of multiple TRPs.

From user equipment (UE) perspective, the layer reception is transparent with respect to the transmitting TRP with the distinction that in CSI feedback stage, for NCJT the precoding weights associated to a layer are applicable to a single TRP out of the configured ones for CSI feedback, while for CJT, the precoding weights are associated with all the selected TRPs.

In Type-II-CJT a UE is configured to measure $K_s=N_{TRP}$ CSI-RS resources, where $N_{TRP}$ is the maximum number of configurable TRPs/TRP groups and it selects $N \leq N_{TRP}$ CSI-RS resources for CSI reporting. Hence, a CJT CSI calculation at the UE, which typically comprises CQI (channel quality indicator), PMI (precoder matric indicator) and RI (rank indicator), is based on the assumption that υ MIMO layers, where v is the rank indicated by the RI, are transmitted from the antenna ports of the N selected CSI-RS resources. Several other assumptions are specified in Clause 5.2.2.5 of 3GPP TS 38.214 for CQI/PMI/RI calculations applicable to the slot associated with the CQI calculation, i.e. the CSI reference resource, including the assumptions on the ratio of physical downlink shared channel (PDSCH) energy per resource element (EPRE) to CSI-RS EPRE, henceforth also termed power control ratio or Pc ratio. This Pc ratio assumption is used by a UE to determine the transmit power of the PDSCH signals from the measured CSI-RS power, such that the CQI of the transmission hypothesis associated with the CSI calculation can be estimated.

FIG. 1 shows an example of a multi-TRP system formed by a maximum of $N_{TRP}=4$ TRPs (or TRP groups) connected via a backhaul link and transmitting coherently to one or more co-scheduled UEs. In this example, it is assumed that each remote radio head (RRH)/TRP has the same array geometry, $N_1 \times N_2$, with $N_1$ antenna ports in azimuth and $N_2$ in elevation, for each of the two polarisations, and hence $2N_1 \times N_2$ antenna ports in total per TRP. In the example, each TRP is equipped with a 2×2 dual-polarised array, such that the total number of transmit antenna ports across the TRPs is $N_{TRP} \times 2N_1 \times N_2=32$.

At present, an agreement has been reached that a UE can assume that the Pc ratio follows a commonly configured powerControlOffset value for all of N selected CSI-RS resources. It was also agreed that in a CJT transmission, the combined precoder across the N selected CSI-RS resources is normalised for each layer and the PDSCH across all the N selected resources is used in CSI calculation. However, no restriction on the configuration of the Pc ratio for each of the $N_{TRP}$ CSI-RS resources is assumed.

Agreement
For the Rel-18 Type-II codebook refinement for CJT mTRP, on PDSCH EPRE assumption for CQI calculation, the UE can assume that the PDSCH EPRE follows a commonly configured powerControlOffset value for all the N selected CSI-RS resources

- Note: For CSI calculation, the combined precoder across N selected (out of the configured $N_{TRP}$) CSI-RS resources is normalized for each layer and the transmitted PDSCH across N selected (out of the configured $N_{TRP}$) CSI-RS resources will be used in CSI calculation (up to the editor)

Note: This doesn't restrict how NW configures powerControlOffset for each CSI-RS resource in general. It pertains to UE assumption on CQI calculation for the CSI-RS resources used in the same CSI reporting setting for Rel-18 Type-II CJT This agreement has been adopted in 3GPP TS38.214 v.18.0.0 such that:

- a UE can assume that the PDSCH signals for υ layers transmitted on the P antenna ports of CSI-RS resource $\sigma_j$ would have the same ratio of EPRE to CSI-RS EPRE for all j = 1, ... , N, equal to the powerControlOffset of the respective CSI-RS resource.

An alternative interpretation of this agreement, proposed but not adopted, was that a UE could assume that the PDSCH signals for υ layers transmitted on the NP antenna ports would have the same ratio of EPRE to CSI-RS EPRE of CSI-RS resource $\sigma_j$, transmitted on the corresponding P antenna ports for all j=1, . . . , N, equal to the powerControlOffset of the respective CSI-RS resource.

Another alternative interpretation of this agreement, proposed but not adopted, was a UE can assume that the PDSCH signals for $\upsilon$ layers would have the same ratio of EPRE to CSI-RS EPRE for all CSI-RS resources $\sigma_j$, with j=1, . . . , N, equal to the powerControlOffset of the respective CSI-RS resource.

In all three proposed interpretations, the understanding of the definition of the PDSCH over CSI-RS EPRE ratio is the same in that it is the ratio between the energy of all the PDSCH ports (i.e., layers), $\upsilon$, multiplexed in an RE and the energy of all the CSI-RS ports from a given CSI-RS resource multiplexed in an RE. In other words, one should consider how many PDSCH ports mapped in one RE are transmitted on the P CSI-RS ports of resource $\sigma_j$: all $\upsilon$ ports. Hence the energy of all those $\upsilon$ ports multiplexed in an RE are included in the PDSCH EPRE calculation. Then, one should consider how many ports of the P ports of CSI-RS resource $\sigma_j$ are multiplexed in one RE and include these in the CSI-RS EPRE calculation.

In summary, the Pc ratio for a CSI-RS resource configured for CJT CSI reporting is agreed to be calculated as follows:

1. PDSCH energy is summed across all layers transmitted on the ports of a CSI-RS resource. The energy of a layer is not split in the portions of energy transmitted by each TRP.
2. CSI-RS energy is summed across all ports of a CSI-RS resource mapped to the same RE.

SUMMARY

Various aspects of examples of the invention are set out in the claims.

According to a first aspect of the present invention, an apparatus comprising: at least one processor; and at least one memory including computer program code the at least one memory and the computer program code configured to, with the at least one processor, cause the apparatus at least to: select an integer number N of channel state information reference signal (CSI-RS) resources out of an integer number of $N_{TRP}$ network configured CSI-RS resources to a resource set associated with a CSI report configuration, wherein $N<N_{TRP}$; determine a scaling factor for the resource set, wherein when $N0<N_{TRP}$, the scaling factor unequal to one; determine at least one CSI component comprising one or more of PMI, RI or CQI, based at least in part on an assumption that a ratio of a transmitted energy per resource element (EPRE) of a PDSCH signal and a transmitted EPRE of the nth CSI-RS resource is equal to the scaling factor times a power control offset configured for the nth CSI-RS resource of the resource set, wherein $n \in [1, N]$; and transmit a CSI report to a network comprising the determined at least one CSI component.

According to a second aspect of the present invention, a method comprising: selecting an integer number N of channel state information reference signal (CSI-RS) resources out of an integer number of $N_{TRP}$ network configured CSI-RS resources to a resource set associated with a CSI report configuration, wherein $N<N_{TRP}$; determining a scaling factor for the resource set, wherein when $N0<N_{TRP}$, the scaling factor unequal to one; determining at least one CSI component comprising one or more of PMI, RI or CQI, based at least in part on an assumption that a ratio of a transmitted energy per resource element (EPRE) of a PDSCH signal and a transmitted EPRE of the nth CSI-RS resource is equal to the scaling factor times a power control offset configured for the nth CSI-RS resource of the resource set, wherein $n \in [1, N]$; and transmitting a CSI report to a network comprising the determined at least one CSI component.

According to a third aspect of the present invention, a non-transitory computer-readable medium encoded with instructions, or a computer program, that, when executed by a processor cause an apparatus to at least to: select an integer number N of channel state information reference signal (CSI-RS) resources out of an integer number of $N_{TRP}$ network configured CSI-RS resources to a resource set associated with a CSI report configuration, wherein $N<N_{TRP}$; determine a scaling factor for the resource set, wherein when $N0<N_{TRP}$, the scaling factor unequal to one; determine at least one CSI component comprising one or more of PMI, RI or CQI, based at least in part on an assumption that a ratio of a transmitted energy per resource element (EPRE) of a PDSCH signal and a transmitted EPRE of the nth CSI-RS resource is equal to the scaling factor times a power control offset configured for the nth CSI-RS resource of the resource set, wherein $n \in [1, N]$; and transmit a CSI report to a network comprising the determined at least one CSI component.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
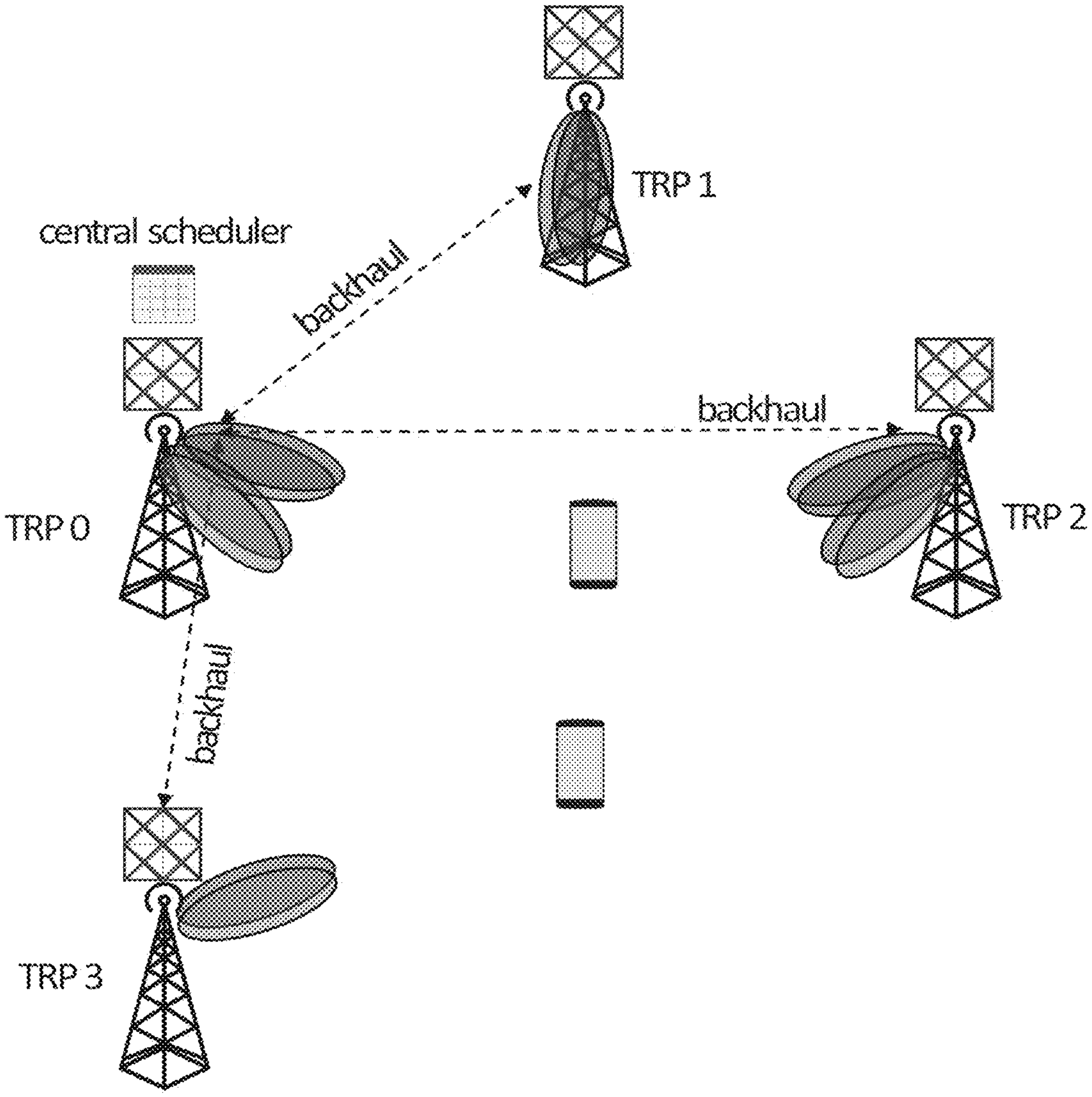
FIG. 1 illustrates an example of a multi-TRP system.

The agreement as previously described, does not restrict the network configuration. If different TRPs experience different path loss, for example, the Pc ratios of the corresponding CSI-RS resources may be configured with different values because the transmitted EPRE of one CSI-RS resource may be different than that of another CSI-RS resource. A UE that does not support PMI calculation with different ratios would hence have to select N CSI-RS resources configured with the same ratio.

Another present problem is that a gNB does not know the number $N \le N_{TRP}$ of selected TRPs by the UE at the time of configuring the Pc ratios for the $N_{TRP}$ CSI-RS resources for channel measurement. Say $E_{PDSCH}$ is the maximum EPRE that a TRP is allowed to transmit at, and $E_{CSI\text{-}RS,\sigma_j}$ the EPRE of the CSI-RS resource $\sigma_j$, assuming that a gNB operates each TRP at maximum power level, the Pc ratio for resource $\sigma_j$ depends on the number of configured TRPs, $N_{TRP}$, i.e.

$$Pc \text{ ratio of } CSI\text{-}RS \text{ resource } \sigma_j = \frac{N_{TRP} \cdot E_{PDSCH}}{E_{CSI\text{-}RS,\sigma_j}}$$

However, if a UE selects $N \le N_{TRP}$ TRPs for CSI reporting, the assumed Pc ratio should assume CJT transmission from N instead of $N_{TRP}$ TRPs, i.e. it should assume:

$$Pc \text{ ratio of } CSI\text{-}RS \text{ resource } \sigma_j = \frac{N \cdot E_{PDSCH}}{E_{CSI\text{-}RS,\sigma_j}}$$

Otherwise the reported CQI would be overestimated. For example, the CQI reported for N=2 TRPs would be 3 dB higher for a configuration with $N_{TRP}$=4 compared to a configuration with $N_{TRP}$=2.

The aforementioned adopted agreement should hence be modified such that a UE can assume that the PDSCH signals for υ layers would have the same ratio of EPRE to CSI-RS EPRE for all CSI-RS resource $\sigma_j$, with j=1, . . . , N, equal to $N/N_{TRP}$ times the powerControlOffset of the respective CSI-RS resource.

The advantages of the preposed scaling on the CQI calculation for CJT CSI reporting is described infra. Although the detailed calculation of a CQI is up to UE implementation and no specific detailed calculation is necessary for implementing embodiments the present invention, certain UE assumptions on the mapping of PDSCH layers to CSI-RS ports and PDSCH transmission power are specified to avoid incorrect CQI determination.

In the present CJT CSI reporting, a UE can support up to rank-4 PDSCH transmission, hence a single PDSCH codeword and a single CQI is calculated per codeword. This CQI can be reported per subband or wideband across the configured reporting band. For a CJT transmission, as mentioned above, a UE assumes that the signal of each PDSCH port (i.e., layer) is transmitted on all the CSI-RS ports of the N selected CSI-RS resources with P ports each and that the power of the PMI for each layer is normalised across these N×P ports independently of the other layers.

A UE can derive the total transmit power of the PDSCH across the υ layers on one subcarrier from the Pc offset definition for CSI-RS resource $\sigma_j$, $P_{c,\sigma_j}$:

$$P_{c,\sigma_j} = \frac{\sum_{p=0}^{v-1} |x^{(p)}|^2}{N_{CDM} \cdot \beta^2_{CSI-RS,\sigma_j}}$$

where $x^{(p)}$ is the PDSCH signal of layer p, $N_{CDM}$ is the number of CDM groups The factor $\beta_{CSI-RS,\sigma_j}$ is the scaling factor applied to mapping of CSI-RS resource $\sigma_j$ to REs, as defined in Clause 7.4.1.5.3 of 3GPP TS 38.211. The PDSCH transmission is specified in Clause 5.2.2.5.1b of TS 38.214 as:

As it is presently proposed to change the notation in the above cited standard specification to denote N as $N_0$, these two notations are here used interchangeably.

The total PDSCH transmitted power depends on the number of transmitting TRPs, under the assumption of a maximum allowed transmit power per antenna. The effect of UE selection of N out of $N_{TRP}$ CSI-RS resources for CJT transmission is that of muting a subset of configured TRPs and their respective antennas, thereby reducing the transmit power of the PDSCH transmission hypothesis. In calculating this power reduction factor, the effect of power backoff, which is needed to ensure that the maximum per antenna power constraint is satisfied if the precoding weights applied to the antenna ports have different amplitudes, is not considered. This power backoff adjustment is typically applied at the gNB depending on actual PDSCH precoding weights, which may be different from reported PMI weights. Therefore, under the assumption of equal amplitude PDSCH precoding weights, or on average over all possible precoders, the total transmitted PDSCH power for a CJT transmission scales linearly with the number of active TRPs, i.e., the total transmitted PDSCH power assuming N transmitting TRPs is N times the total transmitted PDSCH power assuming 1 transmitting TRP, and $N/N_{TRP}$ times the total transmitted PDSCH power assuming $N_{TRP}$ transmitting TRPs, for $1 \le N \le N_{TRP}$.

Because the gNB, in general, does not know in advance the number N of UE selected CSI-RS resources/TRPs, the configured Pc ratio for CSI-RS resource $\sigma_j$ can be expressed as $$P_{c,\sigma_j} = \frac{\left(\sum_{p=0}^{v-1} |x^{(p)}|^2\right)_{N_{TRP}\ transmitting\ TRPs}}{N_{CDM} \cdot \beta^2_{CSI-RS,\sigma_j}}.$$

A UE can obtain the total transmitted PDSCH power from the configured Pc ratio of the j-th selected CSI-RS resource $\sigma_j$, j=1, . . . , N, as follows:

$$\left(\sum_{p=0}^{v-1} |x^{(p)}|^2\right)_{N\ transmitting\ TRPs} =$$

a UE should assume PDSCH signals on antenna ports in the set [1000, ... ,1000 + υ − 1] for υ layers would result in signals equivalent to corresponding symbols transmitted on antenna ports [3000, ... , 3000 + P − 1] of each of the N selected CSI-RS resources, as given by $$\begin{bmatrix} y_{\sigma_1}^{(3000)}(i) \\ \vdots \\ y_{\sigma_1}^{(3000+P-1)}(i) \\ y_{\sigma_2}^{(3000)}(i) \\ \vdots \\ y_{\sigma_2}^{(3000+P-1)}(i) \\ \vdots \\ y_{\sigma_N}^{(3000)}(i) \\ \vdots \\ y_{\sigma_N}^{(3000+P-1)}(i) \end{bmatrix} = W(i) \begin{bmatrix} x^{(0)}(i) \\ \vdots \\ x^{(v-1)}(i) \end{bmatrix}$$

where W(i) is the precoding matrix corresponding to the procedure described in Clause 5.2.2.2.8 and 5.2.2.2.9 for codebookType set to 'typeII-CJT-r18' and 'typeII-CJT-PortSelection-r18', respectively, and $\{\sigma_1, \ldots, \sigma_N\}$ are the indices of the N selected CSI-RS resources in increasing order, such that $1 \le \sigma_1 < \ldots < \sigma_N \le N_{TRP}$. A UE should assume that the signals $y_{\sigma_j}$, j = 1, ... , N, fully overlap in time and frequency.

-continued $$\frac{N}{N_{TRP}}\left(\sum_{p=0}^{v-1}\left|x^{(p)}\right|^2\right)_{N_{TRP}\ transmitting\ TRPs} = \frac{N}{N_{TRP}}P_{c,\sigma_j}N_{CDM}\cdot\beta^2_{CSI-RS,\sigma_j}$$

which is equivalent to assuming a Pc ratio that is a fraction $N/N_{TRP}$ of the configured Pc ratio for that resource.

Applying a scaling factor $N/N_{TRP}$ ensures that a UE does not overestimate the transmitted power when calculating the CQI for a CJT transmission hypothesis with $N<N_{TRP}$ active TRPs, which could lead to a bias towards selecting fewer TRPs for transmission: if the assumed total transmitted power is independent of the number of active TRPs, whereas cross-layer interference increases with the number of active TRPs because there are more interfering transmitting antennas, the estimated CQI tends to increase as the number of active TRPs decreases.

Figure 2:
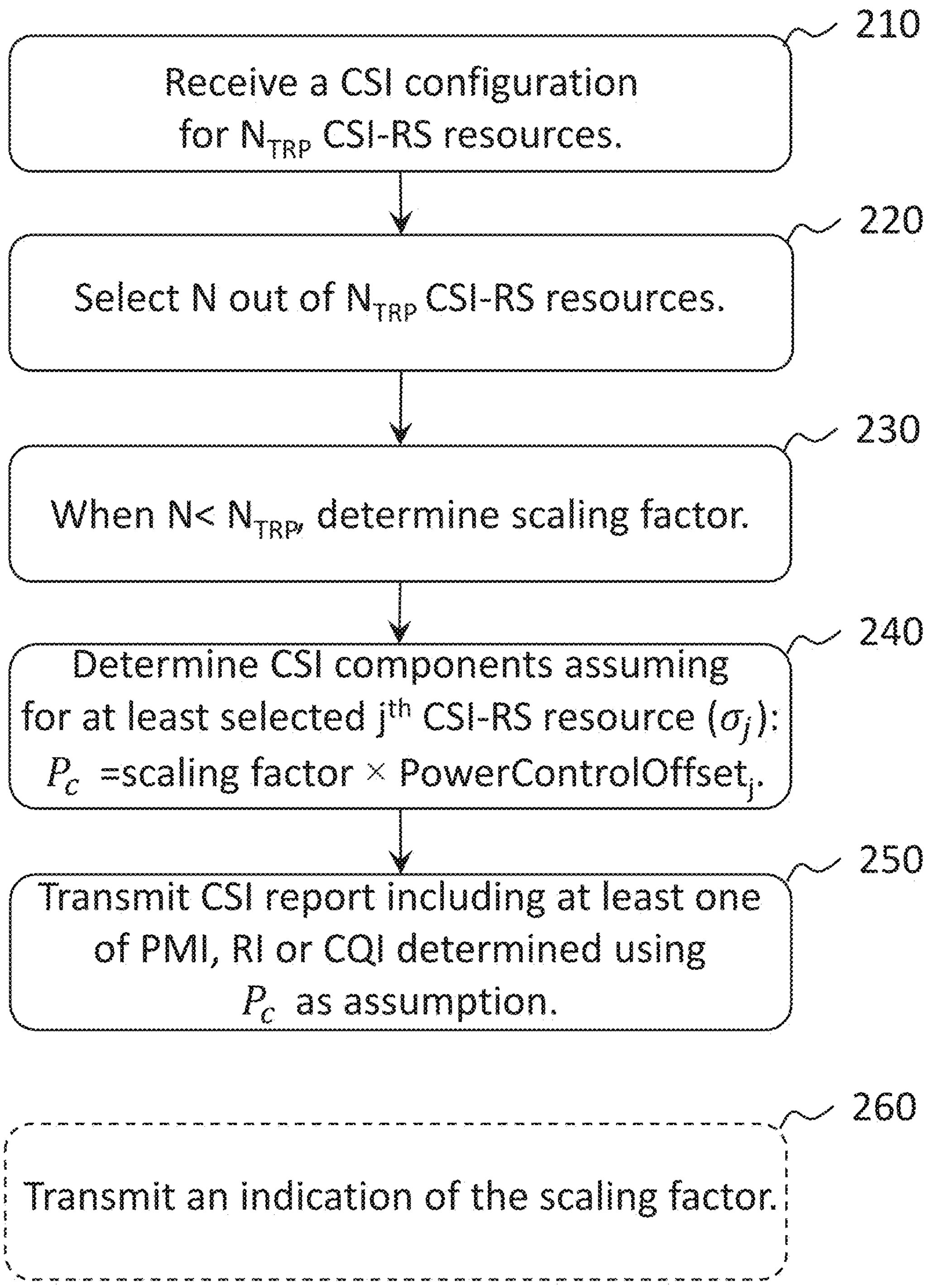
FIG. 2 illustrates various embodiments of the present invention.

FIG. 2 depicts embodiments of the present invention. At 210, UE receives a CSI configuration, wherein the CSI configuration is associated with an integer number ($N_{TRP}$) CSI-RS resources. The CSI configuration is typically received from a network node such as a base station. A UE may receive additional such CSI configurations indicating same or different numbers of CSI-RS resources, and may receive additional CSI configurations that provide no CSI-RS resources, each of which may be received from the same network node or different network nodes. For simplicity, the embodiments are described in relation to a single received CSI configuration, but no such restriction is implied.

Based at least in part on the CSI configuration, the UE selects N out of the $N_{TRP}$ CSI-RS resources for CSI reporting, i.e. the UE selects N out of the $N_{TRP}$ CSI-RS resources into a resource set associated with a CSI report configuration.

When $N<N_{TRP}$, the UE may, at 230, determine a scaling factor. The scaling factor may be $N/N_{TRP}$. Alternatively, the scaling factor may be proportional with $N/N_{TRP}$. The UE may also determine the scaling factor when $N=N_{TRP}$, but in that case the scaling factor may be 1.

At 240, the UE may determine at least one CSI component for one or more of the N selected CSI-RS resources, wherein an individual CSI-RS resource is denoted as $\sigma_j$, j=1 . . . N.

The determination of a CSI component may at least in part be based on an assumption that the ratio of a transmitted EPRE of a PDSCH signal and a transmitted EPRE of the corresponding CSI-RS resource $\sigma_j$, referred to as assumed Pc for CSI-RS resource $\sigma_j$, is equal to the scaling factor times a power control offset configured for the corresponding CSI-RS resource $\sigma_j$.

The determination of the at least one CSI components may at least in part be based on an assumption that the ratio of a transmitted EPRE of a PDSCH signal and a transmitted EPRE of the corresponding CSI-RS resource $\sigma_j$, referred to as assumed Pc for CSI-RS resource $\sigma_j$, is equal to the scaling factor times a power control offset configured for the corresponding CSI-RS resource $\sigma_j$, for each CSI-RS resource of the N selected resources (the resource set).

As the power control offset configured for individual CSI-RS resources may differ or be the same, the assumed Pc for individual CSI-RS resources will differ or be the same accordingly.

As part of the determination of at least one CSI component, the UE may determine the total transmitted PDSCH power corresponding to CSI-RS resource $\sigma_j$ as:

$$(\text{scaling factor}\cdot P_{c,\sigma_j})\cdot N_{CDM}\cdot\beta^2_{CSI-RS,\sigma_j}\ \text{ or }$$

$$\frac{N}{N_{TRP}}P_{c,\sigma_j}N_{CDM}\cdot\beta^2_{CSI-RS,\sigma_j}$$

wherein $N_{CDM}$ is a number of code division multiplex groups, and $\beta_{CSIRS,\sigma_j}$ is the parameter $\beta_{CSIRS}$ for the $j^{th}$ CSI-RS resource as specified in 3GPP New Radio.

At 250, the UE may determine at least one of PMI, RI or CQI based at least in part on the CSI components, or based at least in part on the assumption that the Pc for CSI-RS resource $\sigma_j$ is equal to the scaling factor times a power control offset configured for the corresponding CSI-RS resource $\sigma_j$ for each CSI-RS resource of the N selected resources. The at least one of PMI, RI or CQI may be indicated in a CSI report to a network node.

At 260, the UE may indicate the scaling factor to a network node, which may be performed any time after the scaling factor is determined. The indication may be sent in the CSI report comprising the at least one of PMI, RI or CQI, or may be comprised in a different message, possibly sent earlier or later.

The indication of the scaling factor may indicate the scaling factor itself, the integer number N of selected CSI-RS, or an indication of the selected CSI-RS resources. The indication of the selected CSI-RS resources may for example comprise a bitmap indicating which of the $N_{TRP}$ CSI-RS resources indicated in the CSI report configuration were selected.

Figure 3:
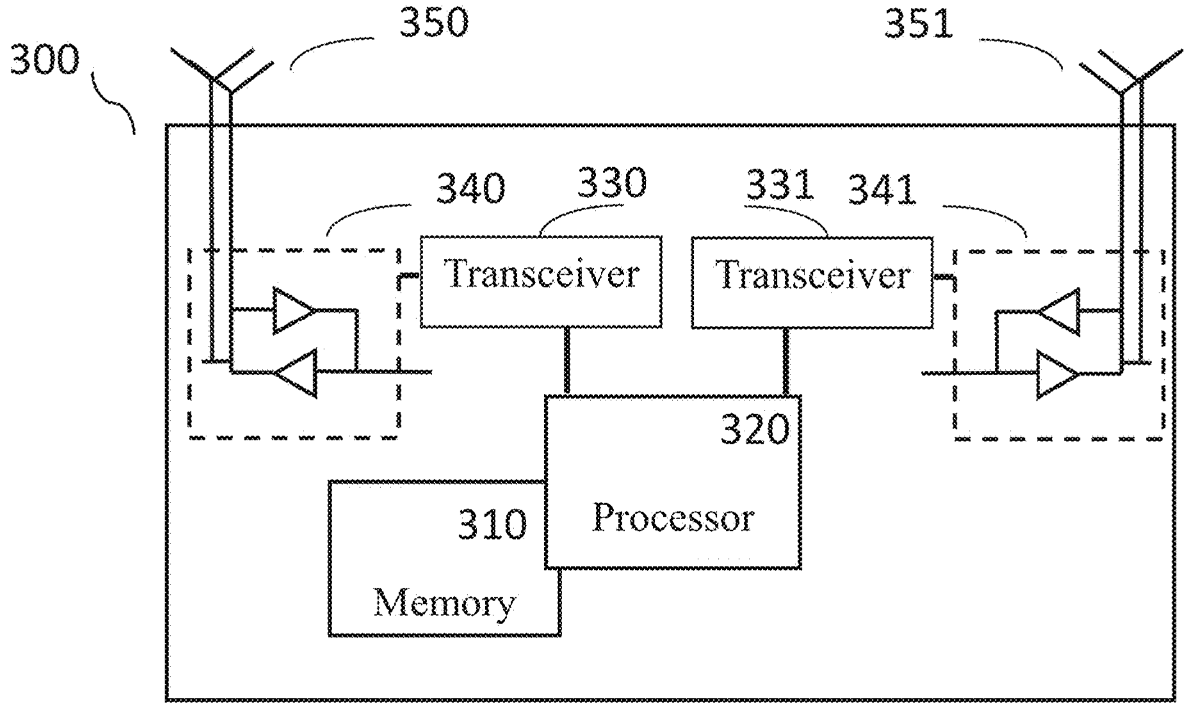
FIG. 3 illustrates a block diagram illustrating an example wireless apparatus in accordance with embodiments of the invention.

FIG. 3 depicts a block diagram illustrating an example wireless apparatus (300) in accordance with embodiments of the invention. The wireless apparatus may include at least one processor (320), at least one memory (310) coupled to the at least one processor (320) and at least one suitable transceiver (330, 331) having a transmitter and a receiver coupled to the at least one processor (320), coupled to at least one antenna unit (350, 351) through at least one amplifier (340, 341). The at least one memory (310) may store computer programs, which may, when executed by the at least one processor (320), for example in combination with any of the at least one transceiver (330, 331), at least one amplifier (340, 341) and at least one antenna unit (350, 351), perform embodiments of the invention. For example, a user equipment, such as a mobile phone, car, watch or drone may be embodied in apparatus 300.

Embodiments of the invention may be implemented in software (executed by one or more processors), hardware (e.g., an application specific integrated circuit or field programmable gate array), or a combination of software and hardware. In an example embodiment, the software (e.g., application logic, an instruction set) is maintained on any one of various conventional non-transitory computer-readable media.

The software, hardware, or combination thereof, or the apparatus 300 or parts thereof, may provide means for performing embodiments of the invention.

Although various aspects are set out above, other aspects comprise other combinations of features from the described embodiments, and not solely the combinations described above.

The invention claimed is:

1. A method for a user equipment, comprising:

selecting an integer number $N_0$ of channel state information reference signal (CSI-RS) resources out of an integer number of $N_{TRP}$ network configured CSI-RS resources to a resource set associated with a CSI report configuration, wherein $N_0<N_{TRP}$;

determining a scaling factor for the resource set, wherein when $N_0<N_{TRP}$, the scaling factor unequal to one;

determining at least one CSI component comprising one or more of precoder matric indicator, rank indicator or channel quality indicator, based at least in part on an assumption that a ratio of a transmitted energy per resource element (EPRE) of a physical downlink shared channel (PDSCH) signal and a transmitted EPRE of the $n^{th}$ CSI-RS resource is equal to the scaling factor times a power control offset configured for the $n^{th}$ CSI-RS resource of the resource set, wherein integer $n \in [1, N_0]$, wherein the scaling factor is determined to be equal to $N_0$ divided by $N_{TRP}$; and transmitting a CSI report to a network comprising the determined at least one CSI component.

2. The method of claim 1, wherein the at least one CSI component determined at least in part based on an assumption that the ratio of a transmitted EPRE of a PDSCH signal and a transmitted EPRE of a corresponding CSI-RS resource is equal to the scaling factor times a power control offset configured for the corresponding CSI-RS resource for each CSI-RS resource in the resource set.

3. The method of claim 1, further comprising:

determining a total transmitted power of the PDSCH signal in accordance with $$\frac{N_0}{N_{TRP}} P_{c,\sigma_n} N_{CDM} \cdot \beta^2_{CSIRS,\sigma_n}$$

wherein $P_{c,\sigma_n}$ is a power control offset configured for the $n^{th}$ CSI-RS resource of the resource set; $N_{CDM}$ is a number of code division multiplex groups, and $\beta_{CSIRS,\sigma_n}$ is a parameter $\beta_{CSIRS}$ for the $n^{th}$ CSI-RS resource.

4. The method of claim 1, further comprising:

transmitting an indication of the scaling factor to a network.

5. The method of claim 4, wherein the indication comprises the scaling factor, the selected integer number $N_0$, or an indication of the selected CSI-RS resources.

6. An apparatus, comprising:

at least one processor; and at least one memory including computer program code, the at least one memory and the computer program code configured to, with the at least one processor, cause the apparatus at least to:

select an integer number $N_0$ of channel state information reference signal (CSI-RS) resources out of an integer number of $N_{TRP}$ network configured CSI-RS resources to a resource set associated with a CSI report configuration, wherein $N_0<N_{TRP}$;

determine a scaling factor for the resource set, wherein when $N_0<N_{TRP}$, the scaling factor unequal to one;

determine at least one CSI component comprising one or more of precoder matric indicator, rank indicator or channel quality indicator, based at least in part on an assumption that a ratio of a transmitted energy per resource element (EPRE) of a physical downlink shared channel (PDSCH) signal and a transmitted EPRE of the $n^{th}$ CSI-RS resource is equal to the scaling factor times a power control offset configured for the $n^{th}$ CSI-RS resource of the resource set, wherein integer $n \in [1, N_0]$, wherein the scaling factor is determined to be equal to $N_0$ divided by $N_{TRP}$; and transmit a CSI report to a network comprising the determined at least one CSI component.

7. The apparatus of claim 6, wherein the at least one CSI component determined at least in part based on an assumption that the ratio of a transmitted EPRE of a PDSCH signal and a transmitted EPRE of a corresponding CSI-RS resource is equal to the scaling factor times a power control offset configured for the corresponding CSI-RS resource for each CSI-RS resource in the resource set.

8. The apparatus of claim 6, wherein the apparatus further caused to:

determine a total transmitted power of the PDSCH signal in accordance with $$\frac{N_0}{N_{TRP}} P_{c,\sigma_n} N_{CDM} \cdot \beta^2_{CSIRS,\sigma_n}$$

wherein $P_{c,\sigma_n}$ is a power control offset configured for the $n^{th}$ CSI-RS resource of the resource set; $N_{CDM}$ is a number of code division multiplex groups, and $\beta_{CSIRS,\sigma_n}$ is a parameter $\beta_{CSIRS}$ for the $n^{th}$ CSI-RS resource.

9. The apparatus of claim 6, further comprising:

transmitting an indication of the scaling factor to a network.

10. The apparatus of claim 9, wherein the indication comprises the scaling factor, the selected integer number $N_0$, or an indication of the selected CSI-RS resources.

11. A non-transitory computer-readable medium encoded with instructions that, when executed by a processor, cause an apparatus at least to:

select an integer number $N_0$ of channel state information reference signal (CSI-RS) resources out of an integer number of $N_{TRP}$ network configured CSI-RS resources to a resource set associated with a CSI report configuration, wherein $N_0<N_{TRP}$;

determine a scaling factor for the resource set, wherein when $N_0<N_{TRP}$, the scaling factor unequal to one;

determine at least one CSI component comprising one or more of precoder matric indicator, rank indicator or channel quality indicator, based at least in part on an assumption that a ratio of a transmitted energy per resource element (EPRE) of a physical downlink shared channel (PDSCH) signal and a transmitted EPRE of the $n^{th}$ CSI-RS resource is equal to the scaling factor times a power control offset configured for the $n^{th}$ CSI-RS resource of the resource set, wherein integer $n \in [1, N_0]$, wherein the scaling factor is determined to be equal to $N_0$ divided by $N_{TRP}$; and transmit a CSI report to a network comprising the determined at least one CSI component.

12. The computer-readable medium of claim 11, wherein the at least one CSI component determined at least in part based on an assumption that the ratio of a transmitted EPRE of a PDSCH signal and a transmitted EPRE of a corresponding CSI-RS resource is equal to the scaling factor times a power control offset configured for the corresponding CSI-RS resource for each CSI-RS resource in the resource set.

13. The computer-readable medium of claim 11, wherein the apparatus further caused to:

determine a total transmitted power of the PDSCH signal in accordance with $$\frac{N_0}{N_{TRP}} P_{c,\sigma_n} N_{CDM} \cdot \beta^2_{CSIRS,\sigma_n}$$

wherein $P_{c,\sigma_n}$ is a power control offset configured for the $n^{th}$ CSI-RS resource of the resource set; $N_{CDM}$ is a number of code division multiplex groups, and $\beta_{CSIRS,\sigma_n}$ is a parameter $\beta_{CSIRS}$ for the $n^{th}$ CSI-RS resource.

14. The computer-readable medium of claim 11, further comprising:

transmitting an indication of the scaling factor to a network.

15. The computer-readable medium of claim 14, wherein the indication comprises the scaling factor, the selected integer number $N_0$, or an indication of the selected CSI-RS resources.

* * * * *